(12) United States Patent
Detraversay et al.

(10) Patent No.: US 12,329,133 B2
(45) Date of Patent: Jun. 17, 2025

(54) METHOD AND CONTROL CIRCUITRY FOR OPERATING AN AUTONOMOUS FEED ROBOT AT A FEED TABLE IN A LIVESTOCK AREA

(71) Applicant: DELAVAL HOLDING AB, Tumba (SE)

(72) Inventors: Maxime Detraversay, Tumba (SE); Jean-Jacques Dreier, Tumba (SE); Szymon Karwacki, Tumba (SE); Ilka Klaas, Tumba (SE)

(73) Assignee: DeLaval Holding AB, Tumba (SE)

( * ) Notice: Subject to any disclaimer, the term of this patent is extended or adjusted under 35 U.S.C. 154(b) by 95 days.

(21) Appl. No.: 17/786,889

(22) PCT Filed: Dec. 11, 2020

(86) PCT No.: PCT/SE2020/051200
§ 371 (c)(1),
(2) Date: Jun. 17, 2022

(87) PCT Pub. No.: WO2021/126052
PCT Pub. Date: Jun. 24, 2021

(65) Prior Publication Data
US 2023/0034976 A1    Feb. 2, 2023

(30) Foreign Application Priority Data
Dec. 20, 2019    (SE) .................................... 1951532-9

(51) Int. Cl.
*A01K 5/02*    (2006.01)
(52) U.S. Cl.
CPC .................................... *A01K 5/02* (2013.01)

(58) Field of Classification Search
CPC ............. A01K 5/01; A01K 5/02; A01K 5/105
See application file for complete search history.

(56) References Cited

U.S. PATENT DOCUMENTS 10,172,322 B2 *    1/2019    Ruizenaar ............ A01K 5/0283
10,558,223 B2 *    2/2020    Leclair ................. G05D 1/0265
(Continued)

FOREIGN PATENT DOCUMENTS

EP    2 806 733    12/2014
EP    3 494 779    6/2019
(Continued)

OTHER PUBLICATIONS

International Search Report for PCT/SE2020/051200 dated Feb. 17, 2021, 3 pages.
(Continued)

*Primary Examiner* — Joshua D Huson
*Assistant Examiner* — Edgar Reyes
(74) *Attorney, Agent, or Firm* — NIXON & VANDERHYE

(57) ABSTRACT

A method for operating an autonomous feed robot at a feed table in a livestock area, in which one or more stationary cameras are disposed to monitor the feed table, includes obtaining one or more images captured using the one or more stationary cameras and indicative of a distribution of feed on the feed table and controlling the operation of the autonomous feed robot based on the distribution of feed indicated by the one or more images. The disclosure also relates to control circuitry, an autonomous feed robot, and a computer program for performing the method.

18 Claims, 4 Drawing Sheets

(56) References Cited

U.S. PATENT DOCUMENTS

| | | | |
|---|---|---|---|
| 2014/0034750 A1* | 2/2014 | Van Kuilenburg | A01K 5/0266 239/71 |
| 2015/0034014 A1* | 2/2015 | Van Kuilenburg | A01K 5/02 119/51.01 |
| 2016/0066546 A1* | 3/2016 | Borchersen | A01K 11/004 382/110 |

FOREIGN PATENT DOCUMENTS

| | | | | |
|---|---|---|---|---|
| WO | 2008/118004 | 10/2008 | | |
| WO | 2009/070007 | 6/2009 | | |
| WO | WO-2010094902 A1 * | 8/2010 | | A01K 5/002 |
| WO | 2012/141577 | 10/2012 | | |
| WO | WO-2013004485 A1 * | 1/2013 | | A01K 1/105 |
| WO | 2015/065171 | 5/2015 | | |
| WO | 2015/178764 | 11/2015 | | |
| WO | 2018/038602 | 3/2018 | | |
| WO | 2018/074917 | 4/2018 | | |
| WO | 2019/035756 | 2/2019 | | |

OTHER PUBLICATIONS

Written Opinion for ISA for PCT/SE2020/051200 dated Feb. 17, 2021, 7 pages.
Search Report for SE1951532-9 dated Jul. 7, 2020, 3 pages.

* cited by examiner

METHOD AND CONTROL CIRCUITRY FOR OPERATING AN AUTONOMOUS FEED ROBOT AT A FEED TABLE IN A LIVESTOCK AREA

This application is the U.S. national phase of International Application No. PCT/SE2020/051200 filed Dec. 11, 2020 which designated the U.S. and claims priority to SE 1951532-9 filed Dec. 20, 2019, the entire contents of each of which are hereby incorporated by reference.

TECHNICAL FIELD

The present disclosure generally relates to feeding animals and in particular to a method for operating an autonomous feed robot at a feed table in a livestock area. The disclosure also relates to control circuitry, an autonomous feed robot and to a computer program for performing the method.

BACKGROUND

Feeding dairy animals, or other livestock, is an important daily routine for farmers which takes a lot of time when performed manually. The animals receive, for example, roughage or total or partial mixed rations at a feed table or feeding fence. In order to save time and effort for the farmer, autonomous feed robots may be used to take care of different tasks of the feeding routine. For example, autonomous feed robots may be programmed to autonomously deliver feed at a feed table.

While eating, the dairy animals will spread part of the animal feed in such a way that it eventually gets out of their reach. The farmer then has to move back the feed, so that it returns within reach of the dairy animals. This used to be carried out by hand, which was very labour intensive, but may nowadays also be done using autonomous feed robots comprising a feed displacer.

Autonomous feed robots are typically powered by an internal battery. Hence, low energy consumption is an important feature for autonomous feed robots in order to for example reduce downtime. Therefore, it is important to operate autonomous feed robots based on actual need. Some solutions have been proposed in the past. For example, EP 2 806 733 B1 proposes an animal feeding system comprising an autonomous feed displacer and a feed level meter which is configured to measure a feed level of the animal feed displaced by the autonomous feed displacer and to emit a feed level signal on the basis of the measured feed level. This solution provides a measure of a feed level for the last operation of the autonomous feed displacer, which may be processed and used when feeding the animals in the future.

However, if the animal's behaviour changes, it cannot be certain that the measure of the feed level during the last operation represents a present amount of feed at the feed table. Also, the feed level is only measured at locations where the feed displacer has previously been operated. Hence, the method fails to provide an overview of the present situation of the entire feed table in real time, as the feed level is only measured at times when the autonomous feed robot is operating. Thus, there is a need for improved methods for operating autonomous feed robots.

SUMMARY

It is an object of the disclosure to alleviate at least some of the drawbacks with the prior art. Thus, it is an object to increase autonomy level of an autonomous feed robot, such that it may automatically react and adjust its operation to the present situation at the feed table.

According to a first aspect, the disclosure relates to a method for operating an autonomous feed robot at a feed table in a livestock area, wherein one or more cameras are stationary arranged in the livestock area to monitor the feed table. The method comprising obtaining one or more images captured using the one or more stationary arranged cameras and indicative of a distribution of feed across the feed table and controlling the operation of the autonomous feed robot based on the distribution of feed indicated by the one or more images. In other words, the distribution of feed on the feed table defines a spread of the feed across the feed table, or in other words the scattering of the feed on the feed table. Thereby, the autonomous feed robot may be operated in an efficient way as the operation may be modified to match a need corresponding to the distribution.

In some embodiments, the obtaining and the controlling are performed in real-time or once per session. Hence, the method may either be performed in real-time or the operation of the autonomous feed robot may be adjusted before every session or run, i.e. before every time the autonomous feed robot is operated in the livestock area, or at least before some sessions.

In some embodiments, the distribution is a lateral distribution in a direction extending away from animals located at the feed table. Thereby, the autonomous feed robot may detect feed that is out of reach of the animals and push it back.

In some embodiments, the controlling comprises adjusting a trajectory of the autonomous feed robot. In other words, the route and/or speed of the autonomous feed robot is adjusted. In some embodiments, a distance between the autonomous feed robot and a feeding fence of the feed table is adjusted. Hence, feed delivery and pushing may be made more efficient and it may be assured that all displaced feed is pushed back.

In some embodiments, the trajectory is adjusted such that the operation of the autonomous feed robot is only performed in parts of the livestock area where a dispersion of feed exceeds a dispersion level. By only operating the autonomous feed robot where needed, energy consumption may be reduced. In some embodiments, the trajectory is adjusted such that no obstacles, detectable based on the obtained images, are present along the trajectory. By considering obstacles in advance, more proactive and efficient operation may be achieved.

In some embodiments, the controlling comprises adjusting an operation schedule of the autonomous feed robot, such that the autonomous feed robot mainly operates at times when a criteria is fulfilled. By only operating the autonomous feed robot when needed, energy consumption may be reduced. In some embodiments, the criteria comprise that a total dispersion of feed present at the feed table exceeds a dispersion level.

In some embodiments, the controlling comprises activating and/or deactivating one or more individually different functionalities of the autonomous feed robot, based on the determined distribution. Thereby energy consuming functionalities may be deactivated when not needed, whereby energy consumption may be reduced. In some embodiments, the individually different functionalities comprise at least one of; dispensing feed, dispensing feed additive, loading feed, activating or inactivating a feed redistribution mechanism and transporting the autonomous feed robot.

In some embodiments, the method comprises defining different areas or paths in the livestock area based on the determined distribution and activating different functionalities of the autonomous feed robot in the different areas or paths. Thereby, the functionalities may be switched on and off in a simple and efficient way.

In some embodiments, the autonomous feed robot is configured to deliver new feed and/or to redistribute feed that is already present on the feed table. Hence, the method may be implemented in different types of autonomous feed robots.

In some embodiments, the method comprises determining the distribution based on a visual contrast, visual shape or visual structure of feed detected in the obtained images. Hence, common visual recognition technologies may be used.

In some embodiments, the determining comprises determining free space between a feeding fence and pile of feed. The free space indicates that the feed may need to be moved closer to a feed fence in order to be within reach for the animals. Hence, feed pushing may be activated when free space behind a pile is detected.

In some embodiments, the method comprises determining, based on the obtained images a number of animals present at the feed table and wherein the controlling is based on the determined number of animals present at the feed table. Thereby, the feeding may be adapted to match the current situation at the feed table.

According to a second aspect, the disclosure relates to control circuitry for operating an autonomous feed robot at a feed table in a livestock area, wherein one or more cameras are stationary arranged in relation to the feed table to monitor at least a part of the feed table. The control circuitry is configured to obtain one or more images, captured using the one or more stationary arranged cameras, and indicative of a distribution of feed across the feed table, and control the operation of the autonomous feed robot based on the distribution of feed indicated by the one or more images.

According to a third aspect, the disclosure relates to an autonomous feed robot configured to operate at a feed table in a livestock area, wherein one or more cameras are stationary arranged in relation to the feed table to monitor at least a part of the feed table. The autonomous feed robot comprises a propulsion device, a power storage, a feed redistribution mechanism and control circuitry according to the second aspect. The propulsion device is configured to propel the autonomous feed robot at a feed table in a livestock area and the power storage is configured to supply energy to propulsion device. The feed distribution mechanism is configured to deliver and/or redistribute feed at the feed table.

According to a fourth aspect, the disclosure relates to a computer program comprising instructions which, when the program is executed by a computer, cause the computer to carry out the method according to the first aspect.

According to a fifth aspect, the disclosure relates to a computer-readable medium comprising instructions which, when executed by a computer, cause the computer to carry out the method according to the first aspect.

DETAILED DESCRIPTION

Visual recognition technology is getting more and more common, reliable and cheap. Visual recognition technology refers to techniques of analysing and understanding an image's content. In a barn visual recognition can be used to increase operation efficiency and to influence energy consumption in different ways. This disclosure is based on the idea of having a system of cameras installed in a livestock area, where an autonomous feed robot is operating. These cameras are arranged to capture images that reveal a distribution of feed present at a feed table. The images may for example be used to enable operating the autonomous feed robot only when it is really needed, and not based on a user guessed, or otherwise predefined schedule. Thus, it is herein proposed to implement visual recognition technology in a livestock area in order to operate an autonomous feed robot to automatically adjust its operation based on a current distribution of feed across the feed table, without any manual intervention. Hence, while the autonomous feed robot device is running, visual recognition is used to for example select a proper route, or adjust the route, and to adjust speed of the autonomous feed robot to match a distribution of feed across the feed table. In other words, based on the distribution of feed along the feed table, a schedule and a trajectory of the autonomous feed robot may be adjusted. Furthermore, different functionalities of the autonomous feed robot may be switched on and off in order to save power. The visual recognition can also provide other useful information by, for example, monitoring the number and/or position of animals at the feed table to determine feed intake and/or feed palatability, monitor changes over time and identify areas at the feed table that are less frequented. This information may be used in combination with the distribution of feed in order to control the operation of the autonomous feed robot.

Below, exemplifying embodiments of an autonomous feed robot and a method for operating an autonomous feed robot will be described with reference to FIGS. 1-6. The embodiments are intended to be performed by control circuitry, which is associated with an autonomous feed robot comprising a feed distribution mechanism configured to deliver and/or redistribute feed at a feed table in a livestock area. The term "associated with" is here intended to cover at least that the control circuitry is operatively connected to the autonomous feed robot. The autonomous feed robot is suitable for operation in a barn in which dairy animals are kept, such as e.g. cow, buffalo, sheep or goat.

Figure 1:
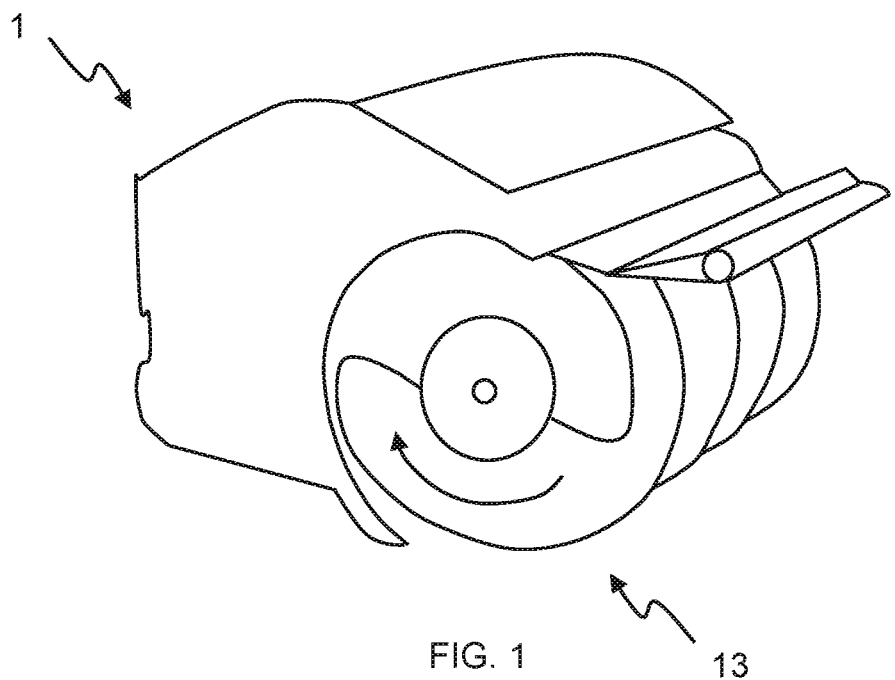
FIG. 1 illustrates an autonomous feed robot according to some example embodiments.

FIG. 1 illustrates an autonomous feed robot 1. The autonomous feed robot 1 comprises a feed distribution mechanism 13 configured to deliver and/or redistribute feed in a livestock area. In the illustrated example the feed distribution mechanism 13 is a feed redistribution mechanism configured to redistribute or move feed. The illustrated feed redistribution mechanism comprises a rotating auger. The rotating auger lifts, mixes, and aerates the feed while repositioning feed closer to a feeding fence. However, other possible implementations of the feed redistribution mechanism comprise a barrel, a skirt, a plough or some other kind of feed redistribution mechanism.

The feed distribution mechanism 13 may alternatively, or in addition, comprise a feed delivery mechanism configured to deliver feed at a feed table. The illustrated autonomous feed robot 1 can be controlled to navigate and move, relatively freely, in at least two physical dimensions, i.e. it is not bound to a fixed track. Hence, the autonomous feed robot 1 is configured to move around autonomously in livestock buildings or generally in a farm area. In particular the autonomous feed robot 1 is configured to move at, along and around a feed table in a livestock area. Note also that a feed table herein refers to any surface where feed is disposed and does not need to be a separate device, but it could as well be a part of the floor. The feed table typically comprises separate feed table parts arranged along one or more alleys in a livestock area, such as a barn. A feeding fence is typically arranged along the alleys between the feed table and the animals. The feed table may comprise several (separate or connected) feed table parts, which may be seen as individual feed tables. However, in this disclosure these individual feed tables are referred to as one single feed table, as the feed table is typically just a part of the floor, on which it is intended to put feed.

Figure 2B:
FIG. 2B illustrates an example embodiment of control circuitry of an autonomous feed robot.
Figure 2B:
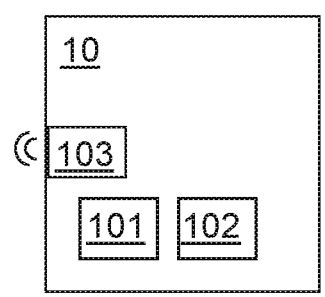
Figure 2A:
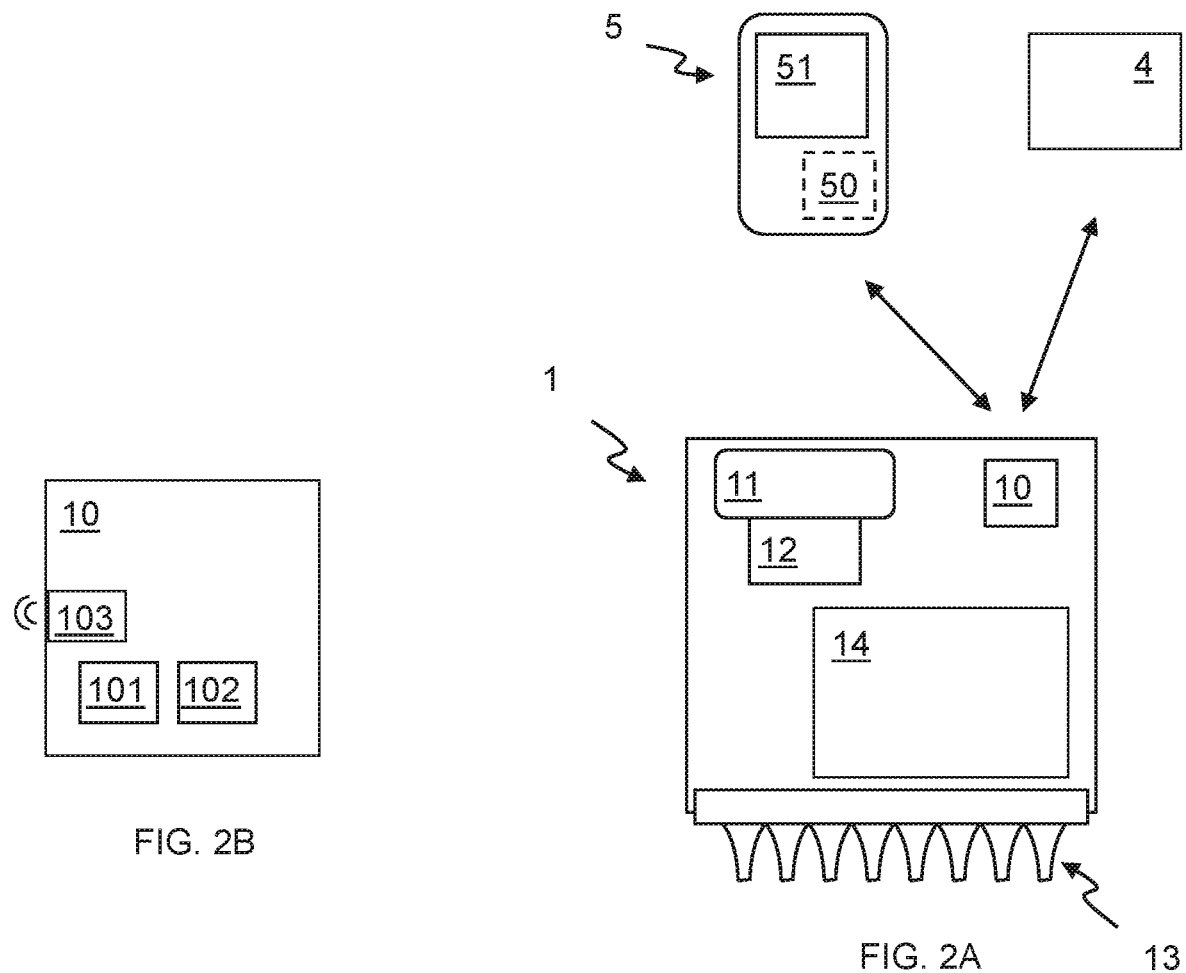
FIG. 2A is a conceptual illustration of the components of the autonomous feed robot, a server and a user device.

FIG. 2A is a conceptual illustration of the components of the autonomous feed robot 1, a server 4 and a user device 5. The illustrated autonomous feed robot 1 comprises, in addition to the feed distribution mechanism 13, a propulsion device 11, a power storage 12, a feed container 14 and control circuitry 10.

It must be appreciated that the autonomous feed robot 1 also comprises further components not illustrated in FIG. 2A, such as components for steering, braking and charging the autonomous feed robot 1 and sensors used for the autonomous control. However, for simplicity only components related to the proposed technique are described herein.

The propulsion device 11 is configured to propel the autonomous feed robot 1. More specifically, the propulsion device 11 is configured to convert energy provided by the power storage 12 into mechanical force. The propulsion device 11 is for example an electrical engine. The power storage 12 is configured to supply energy to the propulsion device 11. The power storage 12 is for example a battery. The power storage 12 is typically charged by a docking station (not shown) where the autonomous feed robot 1 is parked between the sessions, i.e. when it is not operating.

In some embodiments the feed distribution mechanism 13 is configured to deliver or dispense feed. Thus, in some embodiments the autonomous feed robot 1 comprises a feed container 14 comprising feed, typically feed additive such as concentrate or slop feed. However, in some embodiments the autonomous feed robot 1 comprises a feed container 14 of larger size for roughage such as grass-like and hay-like products. Thus, the feed in the feed container 14 may be any type of roughage or even partial or total mixed rations.

The control circuitry 10 is configured to autonomously operate the autonomous feed robot 1 along, around and/or at a feed table. This typically involves propelling, braking and steering the autonomous feed robot 1. In some embodiments it also involves tracking the position of the autonomous feed robot 1. The position may be traced using calculations in combination with data from different sensors such as optical sensors, wireless sensors etc. The control circuitry 10 may also be configured to detect obstacles (for example animals) in the route and to control the autonomous feed robot 1 to avoid such obstacles. In particular the control circuitry 10 is configured to control the propulsion device 11 to propel the autonomous feed robot 1. In some embodiments the control circuitry 10 is configured to perform (at least parts of) the proposed method.

Figure 4:
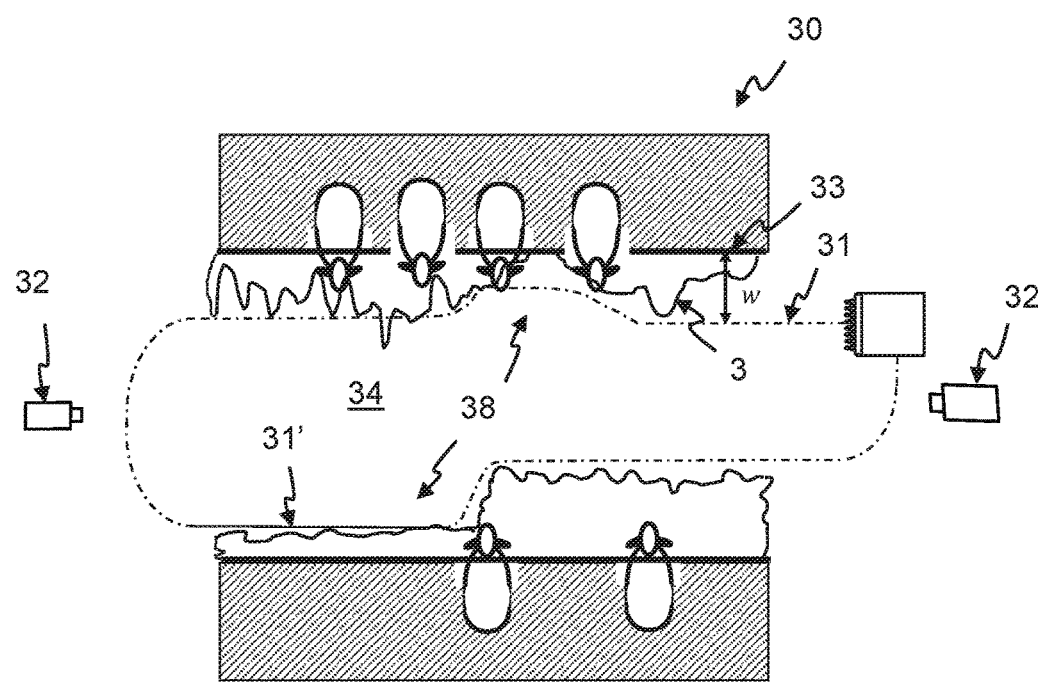
FIG. 4 illustrates a route of an autonomous feed robot along a feed table in a livestock area.
Figure 5:
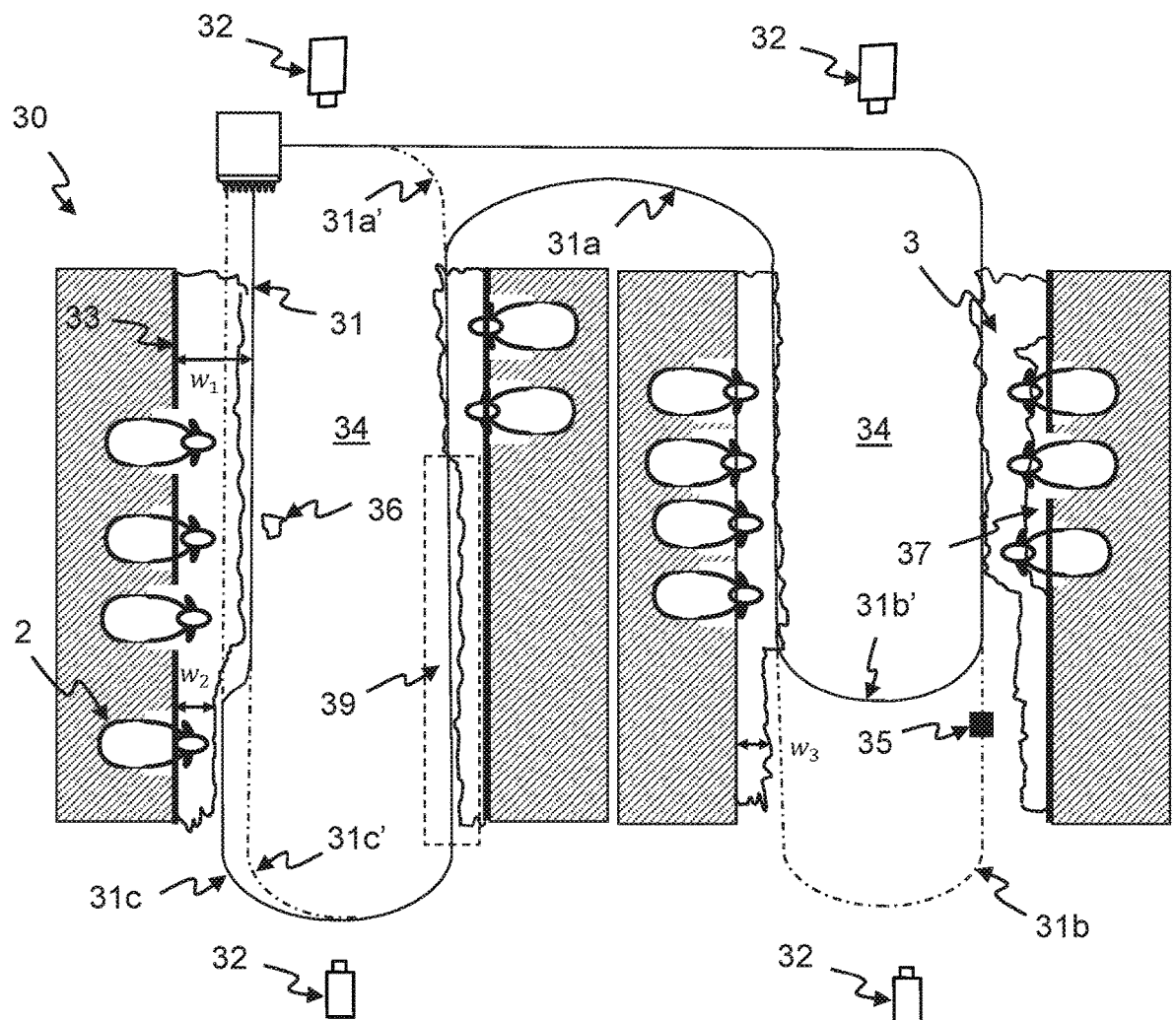
FIG. 5 illustrates different possible routes of an autonomous feed robot along a feed table in a livestock area.

FIG. 2B illustrates the control circuitry 10 in more detail, according to some embodiments. The control circuitry 10 comprises hardware and software. The hardware is for example various electronic components on a for example a Printed Circuit Board, PCB. The most important of those components is typically a processor 101 e.g. a microprocessor, along with a memory 102 e.g. EPROM or a Flash memory chip. The software is typically software code that runs in the microcontroller. The illustrated control circuitry 10 also comprises a communication interface 103. The communication interface 103 is configured for communication of signals and/or data between the control circuitry 10 and remote devices, such as the user device 5 or the server 4. The communication interface 103 is configured for wireless communication, using any suitable protocol e.g. Bluetooth or IEEE 802.11. The communication interface 103 may also be configured for wired communication, for example via a docking station. The communication interface 103 is for example configured to communicate with one or more cameras 32 arranged in a livestock area. In particular the control circuitry 10 is configured to obtain one or more images indicative of a distribution of feed along a feed table in a livestock area 30 from cameras 32 arranged in the livestock area 30 (See. FIGS. 4-5). In some embodiments the communication interface 103 is configured to communicate with a remotely or locally arranged server 4. For example, the control circuitry 10 is configured to receive control data from the server 4 and to control the operation of the autonomous feed robot 1 based on the control data. Thus, some or all of the operation of the autonomous feed robot 1 may be remotely controlled by a remotely or locally arranged server 4.

In some embodiments the control circuitry 10 is a functional unit. Hence, the control circuitry 10 may be distributed between a plurality of physical control units, some of which may be located external to the autonomous feed robot 1.

In some embodiments, the autonomous feed robot 1 is configured to communicate with a user device 5 using the communication interface 103. The user may use the user device 5 to enter user input for use by the autonomous feed robot 1. Information may also be provided to the user via the user device 5.

In the illustrated example, the user device 5 is a smartphone. In other embodiments the user device is a laptop, tablet or any other device. The user device 5 comprises control circuitry 50 and a display 51, here a touch display on which a graphical user interface may be presented. In other embodiments the user device 5 may comprise other devices for receiving user input and providing information to a user, such as a display and buttons. In some embodiments, the user device 5 comprises a software application configured to perform parts of the method proposed herein.

The control circuitry 50 of the user device 5 comprises hardware and software. The hardware is for example various electronic components on a for example a Printed Circuit Board, PCB. The most important of those components is typically a processor e.g. a microprocessor, along with a memory e.g. EPROM or a Flash memory chip. The software is typically software code that runs in the microprocessor. The control circuitry 50 also comprises a communication interface configured to enable communication with the control circuitry 10 of the autonomous feed robot 1.

Figure 3:
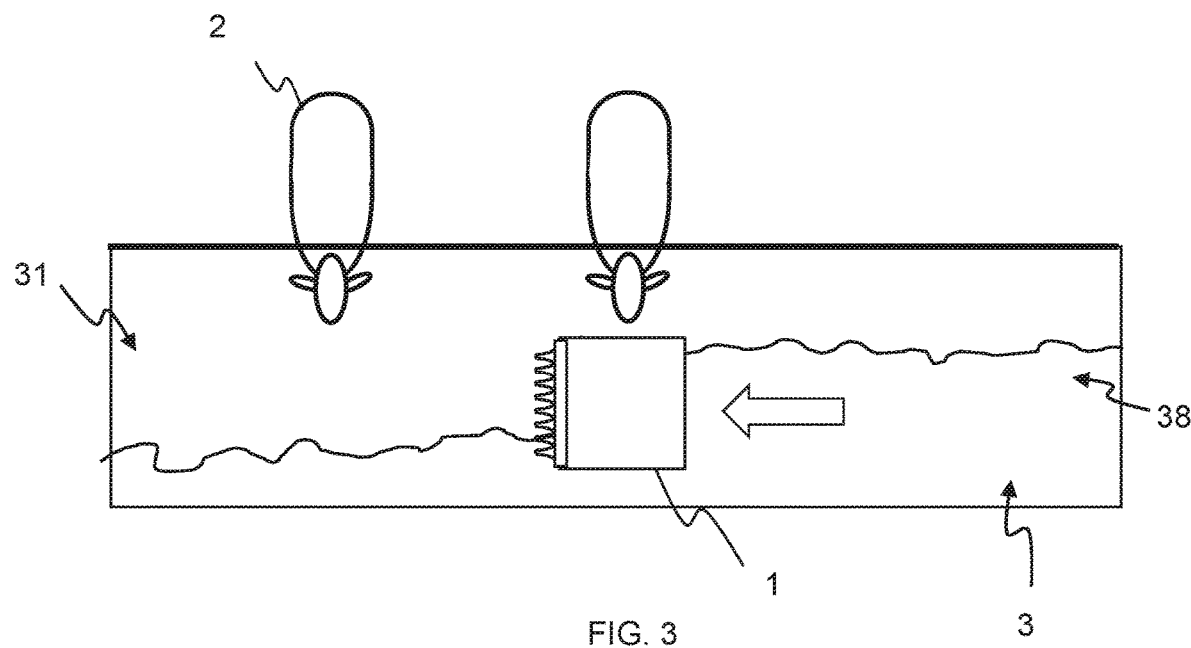
FIG. 3 illustrates an autonomous feed robot operating along a feed table.

FIG. 3 illustrates an autonomous feed robot 1 operating along a feed table 38. FIG. 3 illustrates how the animal feed 3 is formed into a narrower pile through pushing by the feed distribution mechanism 13. In this example, this is achieved by rotation (as indicated by the arrow in FIG. 1) of the auger of the feed distribution mechanism 13. The rotating auger repositions feed closer to the feeding fence 33, and thereby closer to the animals 2. By repositioning the feed 3 closer to the animals 2 and covering empty spots on the feed table 38 with feed, feed 3 is accessible an all available feeding places at the feeding table 38. This reduces competition between animals 2 at the feeding table 38 and misplacements. It also ensures that lower ranked animals get access to feed.

FIG. 4 illustrates the principle of adjusting the operation of an autonomous feed robot 1 based on the on a horizontal distribution of feed across the feed table 38 in a livestock area 30 comprising an alley 34. In particular, based on a lateral distribution in relation to a feeding fence 33 arranged at the feed table 38 along the alley 34. The feed table 38 is arranged on both sides of the alley 34. A plurality of cameras 32 are stationary arranged in the livestock area 30 to monitor the feed table 38. In other words, the cameras are typically fixated in the livestock area, for example on the walls, in the ceiling, or at some other type of stand, which is separate from the autonomous feed robot 1. In this example, cameras 32 are arranged to monitor the alleys 34 between the parts of the feed table 38 (along the alley 34) from both sides. However, more cameras arranged in different directions may be added. Then it is possible to monitor the entire feed table 38 regardless of whether any camera is hidden, e.g. by an animal. The feed table 38 may e.g. be monitored by one or more cameras 32 arranged above the feed table 38 (such as in the ceiling) and directed downwards, to capture images of the feed table from above.

The cameras 32 are configured to capture one or more images indicative of a distribution of feed along the feed table. In this example, the route 31 (indicated with a dash-dotted line) of the autonomous feed robot 1 is adapted such that a distance w between a feeding fence 33 and the route depends on the distribution of feed indicated by the images. In other word, in places where the dispersion is high (e.g. above a threshold), the autonomous feed robot 1 drives further away from the feeding fence 33 than in places where the dispersion is lower (e.g. below a threshold). The dispersion or spread is a measure of the indicated distribution. In other words, dispersion of feed refers to an amount of deviation from a center of the feed, e.g. a center of the feed pile. For example, the dispersion is indicative of how spread out the feed is from the position of animals at the feed fence. In other words, a high dispersion corresponds to a high distribution and vice versa.

In one segment 31' (marked with a solid line) of the route 31 the images indicate that the feed distribution on the feed table is such that no pushing is needed. It is also noted that no animals are present along this segment. Hence, along this segment a feed redistributing mechanism (in this case the auger of the feed robot) is switched off in order to save energy. The speed of the autonomous feed robot 1 may also be increased along this segment 31'.

FIG. 5 conceptually illustrates different possible routes of an autonomous feed robot along two parts of a feed table in a livestock area 30. The livestock area 30 comprises two alleys 34. The feed table is arranged on both sides of the alleys 34. As in the example of FIG. 4, cameras 32 are stationary arranged in the livestock area 30 to monitor the feed table. The cameras 32 are configured to capture one or more images indicative of a distribution of feed 3 along the feed table. In this example the autonomous feed robot 1 is preconfigured to operate along one of a plurality of alternative pre-configured route segments 31a-c, 31a'-c'.

The alternative routes may comprise segments that terminate the route after one alley 31a' or that proceeds to the next alley 31a. The alternative route segments may also comprise segments that terminate the route in the middle of an alley 31b' or that proceeds to the end of the alley 31b. The alternative route segments may also comprise segments, or tracks, at different distances 31c, 31c' from the feeding fence. In some embodiments the autonomous feed robot 1 may switch between these tracks during a route. The number of tracks may be two or more, such as three or four. In a real implementation there would of course be many more options. However, in this example only a few are illustrated for simplicity.

In this example, the route 31 (marked with a solid line) is selected based on the distribution indicated by the images. The route is selected based on different criteria. In FIG. 5, two different alleys are illustrated, a right-hand side alley and a left-hand side alley. In this example, segment 31a that proceeds from the left to the right alley is selected, as there are animals in the right alley and because the feed total distribution in the right alley indicate that feed pushing is required there. Furthermore, the route segment 31b', that terminate the route 31 in the middle of the right alley is selected, as there are no animals 2 present at the end of the right alley and as the feed distribution at the end of the right alley is low, i.e. the width $w_3$ of the feed pile on the corresponding part of the feed table is below a threshold.

Finally, along the left feed table of the left alley the route segment 31c' furthest from the feeding fence is first selected, as the width $w_1$ of the feed pile on the corresponding part of the feed table is considerable (e.g. above a threshold). Hence, if the autonomous feed robot 1 would drive closer to the fence, then all feed would not be reached and could not be pushed. However, at the end of the left alley, where there are fewer animals 2, the width $w_2$ of the feed pile is smaller. Hence, at the end of the alley the autonomous feed robot 1 switches to the other track, which is closer to the feeding fence 33. Hence, the feed can be pushed closer to the feeding fence 33.

Figure 6:
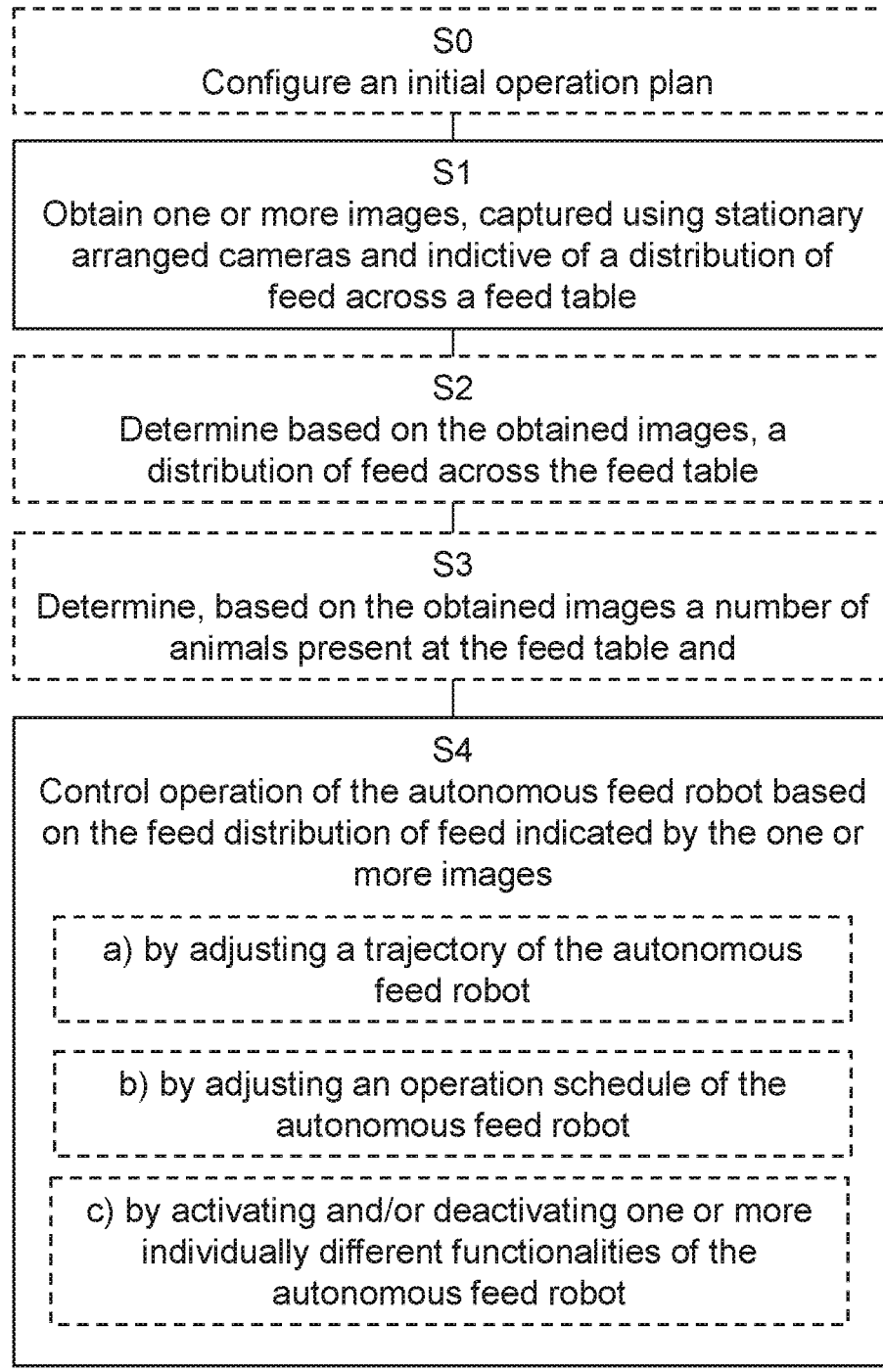
FIG. 6 is a flowchart of the method for operating the autonomous feed robot.

The proposed technique will now be described in further detail with reference to the flow chart of FIG. 6 and the livestock area of FIGS. 4 to 5. FIG. 6 shows an exemplifying method of operating an autonomous feed robot 1 at a in a livestock area 30, using one or more cameras 32 are stationary arranged in the livestock area 30 to monitor the method of FIG. 6 is e.g. performed by control circuitry such as the control circuitry 10 of the autonomous feed robot 1 (FIGS. 2A, 2B). However, the method may alternatively, at least partly, be implemented in control circuitry remote from the autonomous feed robot 1, for example in control circuitry of a user device 5 or a server 4. The method may be implemented as a computer program comprising instructions which, when the program is executed by a computer (e.g. a processor in the control circuitry), cause the computer to carry out the method. According to some embodiments the computer program is stored in a computer-readable medium (e.g. a memory or a compact disc) that comprises instructions which, when executed by a computer, cause the computer to carry out the method.

The autonomous feed robot 1 is operated according to an operation plan that comprises a schedule and a trajectory. The trajectory is defined by position and momentum, where the momentum is the velocity times the mass. Thus, the trajectory defines a route which defines where the autonomous feed robot 1 should drive and a corresponding velocity i.e. speed and travel direction. The schedule defines when the autonomous feed robot 1 should start operating along the trajectory. In other words, the operation plan defines timings for sessions of the autonomous feed robot 1. More specifically a session herein refers to one operation session, which typically comprises one round, or run, in the livestock area. When the autonomous feed robot 1 is not operating, i.e. between the operating sessions, it is typically charged in a docking station.

The proposed method may be used with different types of autonomous feed robots. The method will herein be described with reference to the autonomous feed robot 1 of FIG. 1-5, comprising an auger. However, the method may be used with any autonomous feed robot 1 configured to deliver new feed and/or to redistribute feed that is already present on the feed table.

The first time the autonomous feed robot 1 is put into use in a livestock area 30 it has to be programmed with an initial operation plan. Such an operation plan typically comprises a schedule and a trajectory. In some embodiments the schedule is pre-programmed by the manufacturer. Alternatively, a user has to configure the schedule. However, an initial route comprising one or several possible segments typically needs to be programmed at installation. In other words, in some embodiments the method comprises configuring S0 the autonomous feed robot 1 to operate in accordance with an initial operation plan.

The user input is for example provided to the control circuitry 10 via the communication interface 103. The communication interface 103 then comprises or is in communication with a user interface (not shown). In some embodiments, the user interface may be presented on a user device 5 such as on the display of the user device (FIG. 2B). The user interface may comprise an input device such as a touch screen, keyboard or microphone.

The method comprises obtaining S1 one or more images captured using the one or more stationary arranged cameras 32. For example, the one or more images are received from the one or more cameras 32 using a communication interface, e.g. communication interface 103. The one or more images are typically transmitted using wireless communication techniques, such as Bluetooth or 802.11.

The one or more images are indicative of a distribution of feed across the feed table. A distribution of feed herein refers to a spreading or scattering of feed across the surface of the feed table. In other words, the distribution refers to a spread or dispersion of feed 3 on the feed table. For example, the distribution may be estimated based on an area of the surface of the feed table 38 covered by feed 3. The distribution may also be estimated as a distribution in a certain direction, such as a distance from the feeding fence 33. The distribution is a lateral distribution (in relation to a feed fence) in a direction extending away from animals located at the feed table, i.e. along the feed table. In other words, away from a feed fence, arranged adjacent to the feed table, between the animals and the feed table. Thus, the distribution is a distribution in the plane of the feed table. The images provide an overview of the livestock area. In some embodiments, the images are merged into a larger image. In some embodiments, several images of the same part of the livestock area are obtained for better accuracy or redundancy. The images are either obtained continually or once (or a few times) before every session. In some embodiments, the images are obtained continuously, e.g. in a video streaming session.

Common object recognition techniques may be used to detect feed 3 at a feed table in the livestock area 30. More specifically, the visual contrast (e.g. including colour, brightness, structure etc.) between feed 3 and feed table may be detected in the images. The shape and area (length and width) of the feed (seen from above) may then be determined. In other words, in some embodiments, the method comprises determining S2 the distribution based on a visual contrast, visual shape or visual structure of feed detected in the obtained images.

The feed 3 is typically placed in a feed pile on the feed table. It is typically also relevant to know if there is any free space 37, i.e. empty space, between the pile and the feeding fence 33, as it is then possible to move the pile closer to the feeding fence 33. Hence, in some embodiments, the determining S2 comprises determining free space 37 between a feeding fence and pile of feed.

The images may also depict animals present at the feed table. It is sometimes beneficial to know whether any animals are present at a certain part of the feed table. Therefore, in some embodiments, the method comprises determining S3, based on the obtained images, a number of animals present at the feed table. This may be done using common animal or object detection algorithms.

The operation of the autonomous feed robot 1 may then be adapted based on the situation in the livestock area 30 indicated by the images. Thus, the method comprises controlling S4 the operation of the autonomous feed robot 1 based on the distribution of feed indicated by the one or more images. If the method is performed by the control circuitry 10 of the autonomous feed robot 1, then the control circuitry 10 may control the operation of the autonomous feed robot 1 directly. However, if the method is performed in external control circuitry then the controlling S4 comprises sending control data to the autonomous feed robot 1, e.g. via the communication interface 103.

The controlling may either be performed in real-time while operating the autonomous feed robot 1 using continually obtained images. Alternatively, the controlling may be performed before every session. In the latter case, a route 31 may be selecting before starting the session, based on one or more images of the feed table. Stated differently, in some embodiments, the obtaining S1 and the controlling S4 are performed in real-time and in some embodiments, the obtaining S1 and the controlling S4 are performed once per session.

The controlling S4 may be done in several different ways. In other words, in some embodiments, the controlling S4 comprises adjusting S4a a trajectory of the autonomous feed robot 1. In other words, the method comprises controlling the feed robot to move according to an adjusted trajectory, e.g. along an adjusted route and/or with an adjusted speed. For example, based on the distribution (for example based on the width of the feed pile), the optimal operating distance between the feeding fence and the autonomous feed robot 1 may be determined. This may either be done by selecting one of several possible route segments as described in FIG. 5 or, if the autonomous feed robot 1 is configured to drive freely as in the example of FIG. 4, by simply selecting the optimal distance at each position. The optimal position is typically selected as close to the feeding fence as possible, where the autonomous feed robot 1 may also reach all displaced feed. In some embodiments, the adjusting S4a, comprises adjusting a distance between the autonomous feed robot 1 and a feeding fence of the feed table.

In some embodiments, the adjusting S4a comprises adjusting a speed of the autonomous feed robot 1. For example, it might be efficient to drive faster where there is not so much feed to push or when the auger is switched off.

The operation may also be made more efficient by not operating the autonomous feed robot 1 in parts of the livestock area where there is no feed to push or deliver. Such areas may be identified using the distribution indicated by the images. In other words, in some embodiments, the trajectory is adjusted S4a such that the operation of the autonomous feed robot 1 is mainly performed in parts of the livestock area where a dispersion of feed in the part of the livestock area exceeds a dispersion level. The dispersion threshold may for example be a width of a feed pile or a distance between a feed fence and the feed located furthest from the feed fence at a certain route segment. For example, the autonomous feed robot 1 is mainly performed in parts of the livestock area where there is feed positioned more than 0.7 meter from the fence. The threshold may be adjusted based on how far from the feeding fence the animals can reach. The threshold is for example set to any suitable value between for example 0.3 and 1.2 meters, depending on e.g. type of animals, average size or age of the animals and/or type of feed fence. For example, calves may be able to reach feed 30 cm away from a headlock feeding fence 38 while cows may easily be able to reach 60 cm from a headlock feed fence. However, the same cows may be able to reach 80 cm behind a simple neck-tube feed fence In some embodiments the determining S2 comprises determining a contour of the feed on the surface of the feed table and then the trajectory is adjusted S4a based on the contour. For example, the route of the autonomous feed robot 1 is adjusted such that it follows the determined contour of the feed on the surface of the feed table.

The images may also be used to detect obstacles 35 (FIG. 5) in the livestock area 30. Then, the route may be adjusted in advance to avoid these obstacles, which is typically better than detecting the obstacles 35 using sensors, when the autonomous feed robot 1 is just about to run into them. The obstacles 35 may be any objects, such as animals and tools. An obstacle 35 may also be a big pile of feed, which may then be detected before the autonomous feed robot 1 gets stuck in it. Hence, in some embodiments, the trajectory is adjusted S4a such that no obstacles, detectable based on the obtained images, are present along the trajectory.

The operation may also be made more efficient by not operating the autonomous feed robot 1 at times when there is no feed to push or deliver. It is therefore proposed to use the landscape of the feed coverage to adjust the passage times of the autonomous feed robot 1. Hence, by studying the feed distribution across the feed table the need for pushing or feed delivery may be identified, and the schedule may be adapted accordingly. Hence, sessions may be scheduled earlier or later, or they may even be cancelled. Thus, in some embodiments, the controlling S4 comprises adjusting S4b an operation schedule of the autonomous feed robot 1. The adjusting S4b may be performed such that the autonomous feed robot 1 mainly operates at times when certain criteria are fulfilled. The criteria may comprise that a total dispersion of feed present at the feed table exceeds a dispersion level. The total dispersion may for example be an average dispersion. The criteria may also comprise that the dispersion does not exceed a maximum dispersion in any part or that the amount of feed exceeds a minimum amount all over the livestock area.

The dispersion threshold may for example be related to an area of the feed table, which is covered by feed. For example, the threshold may be defined as an increase of the covered area (e.g. in percentage) since the feed was distributed. For example, the adjusting S4b may be performed such that the autonomous feed robot 1 operates at times when the area covered by feed has increased more than 50% since the feed was delivered.

It is also possible to use the indicated distribution of feed across the feed table to identify places where certain functionality is required or not required. For example, it is possible to identify places where a feed distribution mechanism 13 (e.g. the auger) may be switched off or where more feed or concentrate need to be delivered. Thus, in some embodiments, the controlling S4 comprises activating and/or deactivating S4c one or more individually different functionalities of the autonomous feed robot 1, based on the determined distribution. Examples of individually different functionalities that can be switched on and off are; dispensing feed, dispensing feed additive, loading feed, activating or inactivating a feed redistribution mechanism, mixing feed and transporting the autonomous feed robot. In one example, the obtained images indicate that the distribution of feed in a certain area on the feed table is such that the feed still is within reach for the animals, and then the feed redistribution mechanism may be inactivated to save energy. In one example embodiment, the obtained images indicate that there are animals present, but that they seem not to want to eat the feed. For example, the pile seems to be intact since delivered, which may be detected by comparison with previously obtained images. In such a scenario a concentrate may be added to make the feed tasty. In another example, an extra blade or wing of the autonomous feed robot 1 may be unfolded when a large distribution is detected, i.e. the feed is very spread out.

One way to implement this is to identify different areas where certain functionalities are needed or not needed. For example, in the example of FIG. 5 it may be identified that no pushing is required in the area 39, as the width of the feed pile is small and as the feed pile is positioned right next to the feeding fence 33. Stated differently, in some embodiments, the method comprises defining different areas or paths in the livestock area based on the determined distribution and activating different functionalities of the autonomous feed robot 1 in the different areas or paths.

As mentioned above, vision recognition may also be used to detect animals 2 in the images. Information about animals 2, such as the number of animals and where they are located, can be used in combination with the indicated distribution of feed to control the operation of the autonomous feed robot 1. For example, one might want to reduce the speed in places where many animals 2 are present. Also, the autonomous feed robot 1 may not be operated at all where there are no animals 2 present. In other words, in some embodiments, the controlling S4 is based on the determined number of animals present at the feed table.

The distribution may also indicate leftovers 36, which are positioned out of reach of the autonomous feed robot's route. Such leftovers typically need to be removed at the end of the day. Hence, a trajectory of a last session of the day may be adjusted S4a such that leftovers are collected, e.g. pushed towards the feeding fence 33 or collected in a leftover feed pile at the end of the alley 34. Then they may easily be collected by a farmer at the end of the day or by the autonomous feed robot 1 e.g. using a special blade or scraper.

The disclosure also relates to a corresponding control circuitry configured to operate an autonomous feed robot 1 in a livestock area 30, wherein one or more cameras 2 are stationary arranged in relation to the to monitor at least a part of the livestock area, see FIG. 2B. The control circuitry 10 is herein described with reference to the control circuitry 10 of the autonomous feed robot 1. However, it must be appreciated that the control circuitry may alternatively be implemented, at least partly, outside the autonomous feed robot 1. More particularly, the control circuitry 10 is configured to obtain one or more images captured using the one or more stationary arranged cameras and indicative of a distribution of feed across the and control the operation of the autonomous feed robot 1 based on the distribution of feed indicated by the one or more images.

The control circuitry 10, or more specifically a processor 101 of the control circuitry 10, is configured to cause the control circuitry 10 to perform all aspects of the method described in FIG. 6. This is typically done by running computer program code stored in the memory 102 in the processor 101 of the control circuitry 10.

The terminology used in the description of the embodiments as illustrated in the accompanying drawings is not intended to be limiting of the described method; control circuitry or computer program. Various changes, substitutions and/or alterations may be made, without departing from disclosure embodiments as defined by the appended claims.

The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims.

The invention claimed is:

1. A method for operating an autonomous feed robot at a feed table in a livestock area, one or more stationary arranged cameras disposed in the livestock area to monitor the feed table, the method comprising:
    obtaining one or more images captured using the one or more stationary arranged cameras, the one or more obtained images being indicative of a distribution of feed across the feed table,
    wherein the distribution of the feed is a lateral distribution in a direction extending away from animals located at the feed table and the lateral distribution of the feed is determined based on a visual contrast, visual shape, or visual structure of feed detected in the obtained one or more images; and
    controlling an operation of the autonomous feed robot based on the lateral distribution of feed indicated by the one or more obtained images, wherein the controlling comprises adjusting a trajectory of the autonomous feed robot based on the lateral distribution of feed indicated by the one or more obtained images.

2. The method according to claim 1, wherein the obtaining and the controlling are performed in real-time or once per session.

3. The method according to claim 1, wherein the adjusting the trajectory comprises adjusting a distance between the autonomous feed robot and a feeding fence of the feed table.

4. The method according to claim 1, wherein the trajectory is adjusted such that the operation of the autonomous feed robot is only performed in parts of the livestock area where a dispersion of feed exceeds a dispersion level.

5. The method according to claim 1, wherein the trajectory is adjusted such that no obstacles, detectable based on the obtained images, are present on the trajectory.

6. The method according to claim 1, wherein the controlling comprises adjusting an operation schedule of the autonomous feed robot such that the autonomous feed robot operates at times when a criteria is fulfilled.

7. The method according to claim 6, wherein the criteria comprises that a total dispersion of feed present at the feed table exceeds a dispersion level.

8. The method according to claim 1, wherein the controlling comprises one or more of activating and deactivating one or more individually different functionalities of the autonomous feed robot, based on the indicated lateral distribution.

9. The method according to claim 8, wherein the individually different functionalities comprise at least one of:
    (i) dispensing feed,
    (ii) dispensing feed additive,
    (iii) loading feed,
    (iv) activating a feed redistribution mechanism,
    (v) mixing feed, and
    (vi) transporting the autonomous feed robot.

10. The method according to claim 8, further comprising defining different areas or paths in the livestock area based on the indicated lateral distribution and activating different functionalities of the autonomous feed robot in the different areas or paths.

11. The method according to claim 1, wherein the autonomous feed robot is configured to one or more of: (i) deliver new feed and (ii) redistribute feed that is already present on the feed table.

12. The method according to claim 1, wherein the determining of the lateral distribution of the feed is based on a visual contrast of feed detected in the obtained one or more images.

13. The method according to claim 12, wherein the determining comprises determining free space between a feeding fence and a pile of feed.

14. The method according to claim 1, further comprising:
    determining, based on the obtained images, a number of animals present at the feed table,
    wherein the controlling is based on the determined number of animals present at the feed table.

15. Control circuitry for operating an autonomous feed robot at a feed table in a livestock area, one or more stationary arranged cameras disposed in relation to the feed table to monitor at least a part of the feed table, wherein the control circuitry is configured to:
    obtain, using the one or more arranged stationary cameras, one or more images captured using the one or more stationary arranged cameras, the one or more obtained images being indicative of a distribution of feed across the feed table, wherein the distribution is a lateral distribution in a direction extending away from animals located at the feed table, wherein the lateral distribution of the feed is determined based on a visual contrast, visual shape, or visual structure of feed detected in the obtained one or more images and control an operation of the autonomous feed robot based on the lateral distribution of feed indicated by the one or more obtained images, wherein the control comprises adjusting a trajectory of the autonomous feed robot based on the lateral distribution of feed indicated by the one or more obtained images.

16. An autonomous feed robot configured to operate at a feed table in a livestock area, one or more stationary arranged cameras disposed in relation to the feed table to monitor at least a part of the feed table, the autonomous feed robot comprising:
- a propulsion device configured to propel the autonomous feed robot at the feed table in the livestock area;
- a power storage configured to supply energy to the propulsion device;
- a feed distribution mechanism configured to one or more of deliver and redistribute feed at the feed table; and
- the control circuitry according to claim 15.

17. A system for operating an autonomous feed robot at a feed table in a livestock area, the system comprising:
- one or more stationary arranged cameras disposed in relation to the feed table to monitor at least a part of the feed table; and
- the control circuitry according to claim 15.

18. A non-transitory computer-readable medium having loaded thereon a computer program comprising instructions which, when the program is executed by a computer, cause the computer to carry out a method for operating an autonomous feed robot at a feed table in a livestock area, using one or more stationary arranged cameras disposed in the livestock area to monitor the feed table, the method comprising:
- obtaining one or more images captured using the one or more stationary arranged cameras, the one or more obtained images being indicative of a distribution of feed across the feed table,
- wherein the distribution of the feed is a lateral distribution in a direction extending away from animals located at the feed table and the lateral distribution of the feed is determined based on a visual contrast, visual shape, or visual structure of feed detected in the obtained one or more images; and
- controlling an operation of the autonomous feed robot based on the lateral distribution of feed indicated by the one or more obtained images, wherein the controlling comprises adjusting a trajectory of the autonomous feed robot based on the lateral distribution of feed indicated by the one or more obtained images.

* * * * *